Sept. 8, 1942.  J. B. LUNSFORD  2,294,919
INSULATED ELECTRIC CABLE AND THE LIKE
Filed July 18, 1939    3 Sheets-Sheet 1
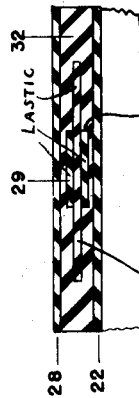
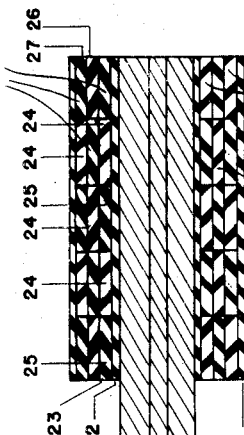
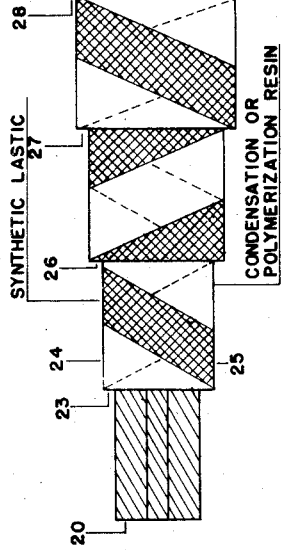
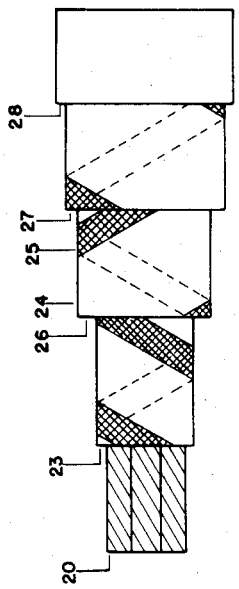
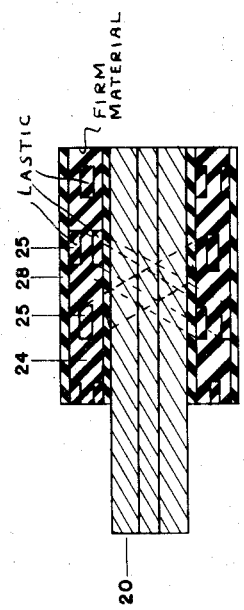
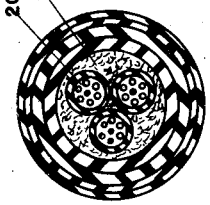
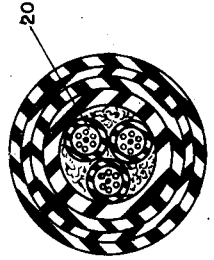
INVENTOR
JESSE B. LUNSFORD
BY *W. Glenn Jones*
ATTORNEY Sept. 8, 1942.　　　　J. B. LUNSFORD　　　　2,294,919
INSULATED ELECTRIC CABLE AND THE LIKE
Filed July 18, 1939　　　　3 Sheets-Sheet 2
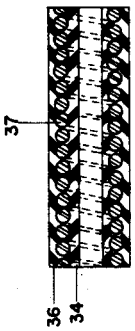
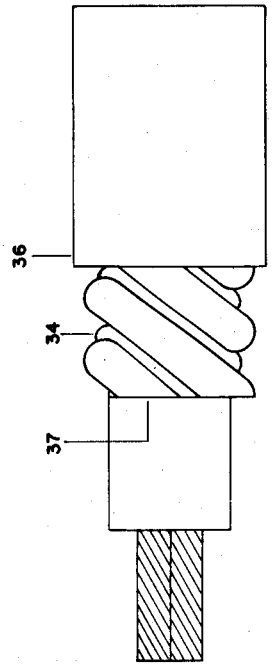
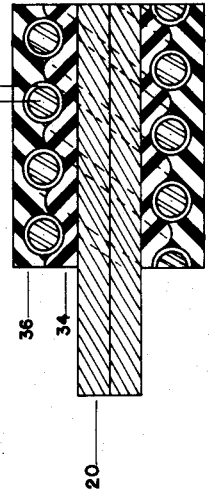
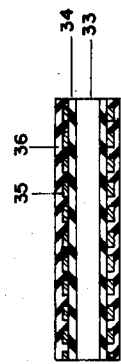
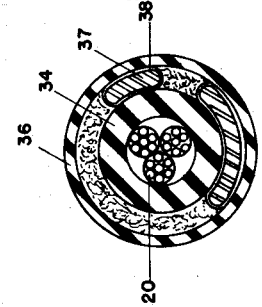
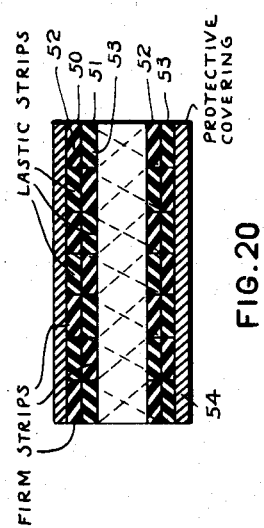
INVENTOR
JESSE B. LUNSFORD
BY
ATTORNEY Sept. 8, 1942.    J. B. LUNSFORD    2,294,919
INSULATED ELECTRIC CABLE AND THE LIKE
Filed July 18, 1939    3 Sheets-Sheet 3

INVENTOR
JESSE B. LUNSFORD
BY *W. Glenn Jones*
ATTORNEY

Patented Sept. 8, 1942

2,294,919

UNITED STATES PATENT OFFICE 2,294,919

INSULATED ELECTRIC CABLE AND THE LIKE

Jesse B. Lunsford, Washington, D. C.

Application July 18, 1939, Serial No. 285,053

9 Claims. (Cl. 174—123)

(Granted under the act of March 3, 1883, as amended April 30, 1928; 370 O. G. 757)

This invention relates to power cables and like constructions wherein dielectric strength, flexibility, mechanical strength, non-propagation of flame, imperviousness to water and resistance to deterioration by oil, grease, heat, and storage battery acid are requisite qualities.

It is one object of this invention to provide articles of the type specified having the above-enumerated characteristics;

A further object is to provide cables and the like having flexible hinging sections between relatively rigid sections. Within the purview of this specification it is apparent that the present invention is not limited to the use of resin, although they are much preferable for many purposes.

In the drawings:

Figs. 1, 2, and 3 are, respectively, a side elevation with parts shown on different radii, a transverse section, and a longitudinal section of one form of cable embodying the present invention;

Fig. 4 is a fragmentary longitudinal section of one form of my cable wherein the component parts are arranged in a different manner;

Figs. 5, 6, and 7 are, respectively, a side elevation on different radii, a transverse section, and a longitudinal section showing a still different arrangement of the component parts;

Fig. 8 is a longitudinal section showing a further modification in the disposition of the insulating elements;

Fig. 9 is a longitudinal section wherein a helically wound, mechanically reinforcing strand is employed;

Figs. 10, 11, and 12 are, respectively, a side elevation on different radii, a transverse section, and a longitudinal section of a modification of the form of invention shown in Fig. 9 wherein the reinforcing strand is provided with a plastic coating.

Figure 13:
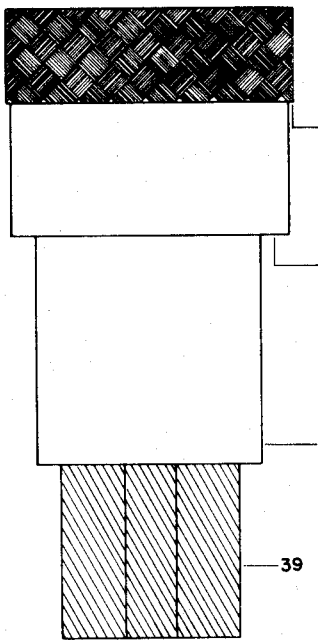
Figure 15:
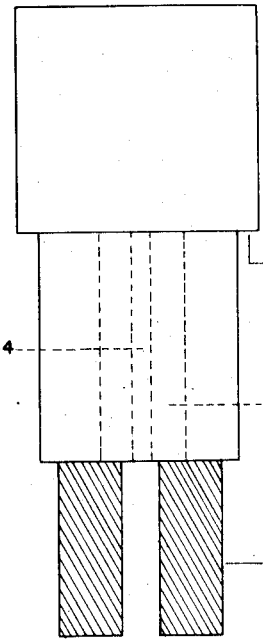
Figure 18:
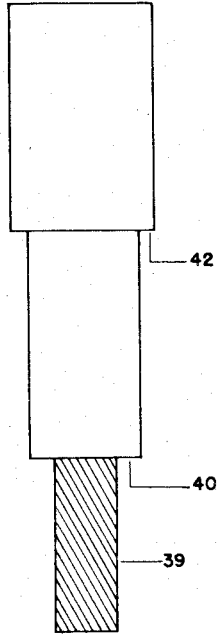
Figure 14:
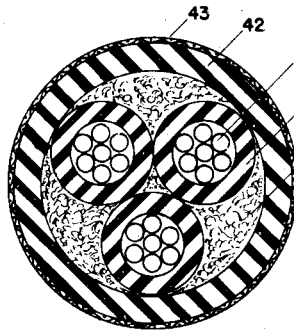
Figure 16:
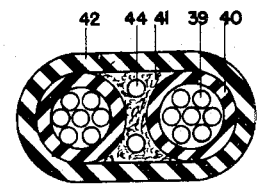
Figure 19:
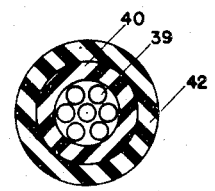
Figure 17:
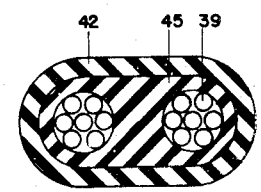

Figs. 13 and 14 are, respectively, a side elevation on different radii and a transverse section of a multi-conductor cable wherein the individual conductors are separately insulated;

Figs. 15, 16, and 17 are, respectively, a side elevation on different radii and two transverse sections of a two-conductor cable;

Figs. 18 and 19 are, respectively, a side elevation on different radii and a transverse section of a single conductor cable;

Fig. 20 is a longitudinal section of a hose made according to the present invention.

It is to be understood that the term "conductor" comprehends both single strand and multi-strand conductive elements.

Patent No. 2,185,558 discloses the insulation of an electric cable with synthetic resin having properties that resist deterioration by the various agencies encountered in service aboardship and further do not propagate flame even if locally ignited by the application of flame for a sufficient period to cause burning where the flame is applied. The present invention is an improvement on that disclosed in my said copending application, in providing to a higher degree the desired dielectric properties as well as increased mechanical strength and less susceptibility to damage during installation when cold.

Shipboard service frequently requires that an electric cable be installed during cold weather and hence should be highly flexible or plastic and yet must be operated over long periods of time under conditions of relatively high temperature. These two circumstances demand directly opposed qualities in the cable. If the insulation is sufficiently plastic to bend readily at low temperature, it usually is not satisfactory for use under high temperatures, since cold flow causes decrease in the cross section of the cable where it passes through terminals or packing glands and so compromises the water or gas tight integrity of the compartments between which the cable passes. If the cable sheath is not subject to cold flow at operating temperatures frequently encountered, then it is so hard and brittle at low temperatures that the sheath is frequently ruptured during installation at such temperatures, and the cable fails.

A further consideration is that high electrical qualities in a resin preclude high mechanical characteristics, any improvement in one being at the expense of a reduction in the other.

The present invention contemplates constructing a cable sheath of two materials which, combined in the manner herein disclosed, give the sum of the desired properties rather than the average thereof, as is the case in a single resin representing a compromise. One component of the layer is firm and provides the desired dielectric strength and prevention of cold flow, while the other imparts the requisite flexibility, resistance to deterioration and flame propagation, and plasticity to prevent rupture by installation during cold weather.

The synthetic resins employed for their electrical qualities, herein called electrical resins, may be of the condensation type such as phenolic-aldehydic, amino-aldehydic, or hydroxy-carboxylic, which are heat reactive. Or they may be of the polymerization type such as vinyl, acrylic, styrene, or indene, which are thermoplastic. The resins used for mechanical strength and flexibility, which may be called mechanical resins, may be broadly termed synthetic lastics and are substances such as polymers of butadiene and its derivatives, organic polysulfides, miscellaneous substances produced from isobutylene, styrene and polyvinyl chloride, plasticized with tricresyl phosphate.

In general, one aspect of the present invention may be described as residing in the provision of sections that are predominately of a synthetic lastic that forms a hinge joint between more rigid sections of resins having the desired electrical qualities but that are relatively rigid and serve to prevent excessive cold flow of the more plastic material.

There are a number of condensation resins desirable for their electric properties commercially available that are suitable for practicing this invention, sold under the trade names of Bakelite (a phenol-aldehydeic resin), Formex, Formvar, (both polyvinyl acetal resins), Glyptal, Rezyl, both glycerol-phthalic anhydride resins), Vinylite (a polyvinyl chloride resin), etc. Among the commercially sold compositions in the class of synthetic lastics are Koroseal, Okoseal, Gencaseal, Habirseal, (all polyvinyl chlorides), Neoprene (polychloroprene), Glyptal-Neoprene (glycerol-phthalic anhydride plus polychloroprene), Thiokol (organic polysulphide), etc. It is understood that each of the foregoing materials includes a plasticizer which is usually tricresyl phosphate.

The constructions specifically disclosed herein are shown and described by way of illustration and not of limitation since the principle of providing flexible hinging sections between relatively rigid sections in the sheath of an electrical cable is susceptible of great variation to adapt the construction to the requirements of various specific uses.

In Figs. 1, 2, and 3, an embodiment of my invention is depicted in connection with a cable having the three conductors 20 separated from each other by fibrous material 21, such as as asbestos, glass fiber, etc. Upon the material 21 there is formed an insulating layer 22, preferably by extrusion, of synthetic resin having high dielectric qualities, such resin being of the condensation or polymerization type. Upon the layer 22 is laid a second layer 23 formed of alternating helically wound strips or tapes 24 and 25 that are respectively resin having high electrical qualities and synthetic lastic. The succeeding layers 26 and 27 are likewise formed, the strips of layer 26 being wound in the opposite angular sense to those in layer 23 while those in layer 27 are wound in the same angular sense as in layer 23. It will be observed in Fig. 3 that the synthetic lastic strips 25 in layers 23 and 27 are substantially in radially superposed relation, while the strips of lastic in layer 26 lie between two strips of electrical resin in layers 23 and 27.

It is evident that the strips of electrical resin will prevent excessive cold flow of the lastic while the sections where the two strips 25 of lastic are superposed will be more highly flexible than where the two strips 24 of relatively firm electrical resin are superposed. The layers 23, 26 and 27 are all enclosed in an outer layer 28 of lastic which gives mechanical strength to the whole and is resistant to abrasion.

The strips of lastic are preferably left without fibrous reinforcement of any kind, the thickness and width thereof being varied to suit the requirements of any particular service, being greater in cables of larger size although not necessarily proportionately greater. The electrical resin is preferably applied in the form of a tape having fibrous or textile reinforcement. It is, of course, understood that in the finished form of the cable all the various layers are bonded together by the methods known to the art adapted for the materials used.

Fig. 4 is a fragmentary longitudinal section showing the layers on one side of the core of a cable. The innermost layer 22 is an electrical resin and the outermost layer 28 is a synthetic lastic. The synthetic lastic strips 29, 30, and 31 in successive layers are shown in radially superposed relation, the first and last enumerated being of substantially the same width while the intermediate strip 30 extends longitudinally of the cable considerably beyond the edges of strips 29 and 31. The material designated generally by the reference character 32 is electrical resin in the various layers bonded together. It is apparent that this construction provides a definite localized hinging section between the more rigid sections of electrical resin at each side thereof. The lastic strips 29, 30 and 31 are helically wound with a pitch that provides the desired length of rigid section.

The embodiment shown in Figs. 5, 6, and 7 is in general similar to that depicted in Figs. 1, 2, and 3 except that the strips 25 of synthetic lastic are relatively narrower than in Figs. 1, 2, and 3 and the pitch of the helix is greater, resulting in sections of electric resin 24 that are solely of electric resin without lastic and so the hinging joints are somewhat more localized.

Fig. 8 illustrates a conductor 33 having on it a layer of electrical resin 34 upon which is wound a mechanical reinforcing tape 35 with an outer layer 36 of lastic enclosing the tape 35 and layer 34 and filling the space between the turns of the tape. The pitch of the helix upon which tape 35 is wound is small and hence bending of the cable will apply but little stress to the tape 35 inasmuch as the fibers in tape 35 extend substantially circumferentially and not longitudinally.

Fig. 9 is in general similar to Fig. 8 except that a reinforcing strand 37 that is circular in cross section is wound upon the inner layer 34 and is partially embedded therein, the outer layer 36 of lastic filling in the remaining space between the turns of the reinforcing strand.

Figs. 10, 11, and 12 disclose a construction very similar to that in Fig. 9 but on a larger scale and with the added feature that the reinforcing strand 37 is provided with a coating 38 of a soft, readily plastic, synthetic resin that will flow at a temperature of about 85° C. and will seal any cracks that may develop in the underlying layer 34 of electric resin. Instead of a definite exterior coating the reinforcing strand 37 may be impregnated with the highly plastic synthetic resin. A suitable material for the coating or impregnation of the reinforcing strand 37 is a co-polymer of vinyl chloride-vinyl acetate type. A suitable commercially available composition is essentially 85% vinyl chloride and 15% vinyl acetate, but has in addition suitable plasticizer, filler and coloring matter. The strand 37 may be glass fiber, asbestos, cord, or any other material particularly adapted for a specialized use.

In the modification of my invention shown in Figs. 13 and 14, the conductors 39, shown as being of the multistrand type are separately enclosed in insulating layers 40 of an electric resin, the space between the individually insulated conductors being filled with fibrous material 41 and the whole enclosed in a layer 42 of synthetic lastic, protected by metal armor 43 if desired.

Figs. 15, 16, and 17 illustrate special constructions for two-conductor cables. In the form disclosed in Fig. 16, the conductors 39 enclosed in layers 40 of electric resin are parallel to each other with fibrous filling 41 between the layers 40 and the outer sheaths 42 of lastic completing the structure. Reinforcing wires 44 to lend added mechanical strength may be used if desired. In Fig. 17 the conductors 39 are embedded, spaced from each other, in a common body 45 of electric resin and enclosed in a layer 42 of synthetic lastic.

The single conductor construction shown in Figs. 18 and 19 utilizes a layer 40 of electric resin on the conductor 39 and a surrounding layer 42 of synthetic lastic.

The form of the invention shown in Figs. 15 to 18 is particularly adapted to small conductors where temperature conditions at the time of installation are not important. The conductor in these cases may be a single wire. The material 40 has high electrical properties but may be very brittle. The lastic 42 then prevents fracture of the material 40, by distributing stresses so they cannot localize and cause rupture. This principle of operation is exemplified by the fact that a cigarette around which Cellophane has been wrapped can be tied in a knot without breaking.

The purview of this invention also extends to the use of a plurality of layers of synthetic resins having different properties. The layer nearest the conductor will have very high electrical characteristics and very poor mechanical properties, the next layer will be of reduced electrical properties and enhanced mechanical properties, and the outer layer will have high mechanical characteristics but may be, and usually necessarily is, poor electrically. There is thus produced an optimum gradient of electrical properties that is highest next the conductor and diminishes outwardly, and of mechanical propreties that is highest at the surface and decreases inwardly.

It is apparent that the construction herein disclosed may be utilized for hose, also, except that the electrical qualities of the resin forming the relatively rigid sections between the highly flexible sections of mechanical resin need not be considered as of importance. A hose of this nature would have long life even though used for conveying chemicals and highly heated fluids, and would resist damage by flexion to a much greater extent than hose of conventional construction.

A hose of this type is shown in Fig. 20 wherein the two layers 50 and 51 are made up of alternating helically wound strips 52 of relatively firm material and strips 53 of lastic. The material used is fluid-impervious and suited to resist deterioration by the fluids to be conveyed. The outer covering 54 is tough and resistant to abrasion.

The invention herein described and claimed may be used and/or manufactured by or for the Government of the United States of America for governmental purposes without the payment of any royalties thereon or therefor.

I claim:

1. An electric cable, comprising a conductive core, a layer of synthetic resin having high dielectric properties around said core, a mechanically reinforcing strand wound helically upon said layer and partially embedded therein, said strand consisting in part of synthetic resin more plastic than said layer to flow and fill any cracks developed in said layer, and a layer of synthetic lastic completely overlying the said inner layer and the said strand and bonded thereto.

2. An electric cable, comprising a conductive core, three coaxial layers upon said core, each said layer comprising alternating helically wound, substantially equal strips of synthetic resin having high dielectric properties and of synthetic lastic, the synthetic lastic strip in the outermost of said layers substantially radially overlying the said strip in the innermost of said layers, and the said lastic strip in the intermediate layer being staggered longitudinally of said cable with respect to the other two said strips, said layers being bonded together throughout their whole surfaces of contact with each other.

3. An electric cable, comprising a conductive core, three coaxial layers upon said core, each said layer comprising alternating helically wound strips of synthetic resin having high dielectric properties and of synthetic lastic, the said lastic strip in the outermost layer substantially radially overlying the said lastic strip in the innermost of said layers, and the intermediate lastic strip lying radially between the other two said lastic strips and extending longitudinally of said cable beyond the edges of the other lastic strips a distance on the order of the width of said other lastic strips, said layers being bonded together throughout their whole surfaces of contact with each other.

4. An electric cable, comprising a conductive core, a plurality of superposed coaxial layers on said core, each said layer including alternating helically wound strips of relatively inelastic synthetic resin having high dielectric properties and of synthetic lastic, said lastic being relatively readily deformable without rupture, said lastic strips being disposed between relatively inelastic sections of said synthetic resin so as to constitute hinging sections, said layers being bonded together throughout their whole surfaces of contact with each other.

5. An elongated flexible body, comprising a plurality of superposed coaxial layers, each said layer including alternating helically wound strips of synthetic resin and of synthetic lastic, said resin being relatively inelastic and said lastic being relatively readily deformable without rupture, said lastic strips being disposed between relatively rigid sections of said resin so as to constitute hinging sections, said layers being bonded together throughout their whole surfaces of contact with each other.

6. An electric cable, comprising a conductive core, a plurality of superposed coaxial layers on said core, each said layer including alternating helically wound strips of synthetic resin and of synthetic lastic, said synthetic resin being relatively inelastic and said lastic being relatively readily deformable without rupture, said lastic strips being disposed between relatively rigid sections of said synthetic resin so as to constitute hinging sections, said layers being bonded together throughout their whole surfaces of contact with each other.

7. An electric cable, comprising a conductive core, three coaxial insulating layers around said core, each said layer comprising alternating helically wound strips of relatively inelastic material having high dielectric properties and of synthetic lastic, the said strips in the innermost and the outermost said layers being wound in the same angular sense and the said strips in the intermediate layer being wound in the opposite angular sense, all said layers being bonded together throughout their surfaces of contact.

8. An electric cable, comprising a conductive core, three coaxial insulating layers around said core, each said layer comprising alternating helically wound strips of relatively inelastic material having high dielectric properties and of synthetic lastic, the said strips in the innermost and the outermost said layers being wound in the same angular sense and the said strips in the intermediate layer being wound in the opposite angular sense and an outermost protective covering all said layers being bonded together throughout their surfaces of contact.

9. An elongated flexible body, comprising a plurality of superposed coaxial layers, each said layer including alternating helically wound strips of relatively inelastic fluid-impervious organic material and of fluid-impervious organic material that is readily deformable without rupture, said strips of readily deformable material being disposed between the more rigid sections of the relatively inelastic material to constitute hinging sections, all said layers being bonded together throughout their entire surfaces of contact with each other.

JESSE B. LUNSFORD,